United States Patent
Huang et al.

(10) Patent No.: US 9,631,348 B2
(45) Date of Patent: Apr. 25, 2017

(54) WATER SAVING CONTROL MECHANISM

(71) Applicant: XIAMEN EASO CO., LTD., Xiamen (CN)

(72) Inventors: Lieyong Huang, Xiamen (CN); Senyi Li, Xiamen (CN); Haitao Lu, Xiamen (CN)

(73) Assignee: XIAMEN EASO CO., LTD., Xiamen, Fujian (CN)

( * ) Notice: Subject to any disclaimer, the term of this patent is extended or adjusted under 35 U.S.C. 154(b) by 33 days.

(21) Appl. No.: 14/790,004

(22) Filed: Jul. 2, 2015

(65) Prior Publication Data

US 2017/0002553 A1 Jan. 5, 2017

(51) Int. Cl.
 *E03C 1/04* (2006.01)
 *F16K 11/02* (2006.01)
 *F16K 31/60* (2006.01)
 *E03C 1/02* (2006.01)

(52) U.S. Cl.
 CPC ............ *E03C 1/0408* (2013.01); *F16K 11/02* (2013.01); *F16K 31/60* (2013.01); *E03C 2001/026* (2013.01)

(58) Field of Classification Search
 CPC .. E03C 1/0408; E03C 2001/026; F16K 31/60; F16K 11/02
 USPC ....... 239/436, 380–383, 389, 443, 447, 550, 239/551, 570, 581.1, 581.2, 582.1
 See application file for complete search history.

(56) References Cited

U.S. PATENT DOCUMENTS

| | | | | |
|---|---|---|---|---|
| 4,588,130 A | * | 5/1986 | Trenary | B05B 1/1636 239/381 |
| 7,100,845 B1 | * | 9/2006 | Hsieh | B05B 1/18 239/444 |
| 7,143,961 B1 | * | 12/2006 | Wu | E03C 1/0408 239/436 |
| 7,748,649 B2 | * | 7/2010 | Fujii | E03C 1/0408 239/436 |
| 7,857,241 B2 | * | 12/2010 | Deng | E03C 1/06 239/436 |
| 8,066,203 B2 | * | 11/2011 | Zhou | B05B 1/1636 239/443 |
| 8,297,534 B2 | * | 10/2012 | Li | B05B 1/1654 239/222.11 |
| 8,418,935 B2 | * | 4/2013 | Chen | B05B 3/0427 239/237 |
| 8,881,993 B2 | * | 11/2014 | Lev | B05B 1/1636 239/394 |
| 8,915,455 B2 | * | 12/2014 | Zhou | A61H 9/0021 239/101 |
| 9,067,225 B2 | * | 6/2015 | Zhou | B05B 1/1645 |
| 9,068,325 B2 | * | 6/2015 | Neagoe | E03C 1/0408 |

(Continued)

*Primary Examiner* — Arthur O Hall
*Assistant Examiner* — Steven M Cernoch
(74) *Attorney, Agent, or Firm* — Leong C. Lei

(57) ABSTRACT

A water saving control mechanism includes a main body and a dynamic distribution device disposed in the main body. The main body is a three-way configuration having two water outlets and a water inlet. The dynamic distribution device includes a stopper disposed in a water channel of the main body and a drive assembly driven by water flow to bring the stopper to move. When the stopper is driven by the drive assembly, the stopper is to block one of the water outlets by turns for water outflow. The present invention not only saves water but also provides a massage effect to relieve fatigue.

5 Claims, 13 Drawing Sheets

(56) References Cited

U.S. PATENT DOCUMENTS

| | | | | |
|---|---|---|---|---|
| 9,273,452 B2* | 3/2016 | Wilson | ................... | E03C 1/066 |
| 9,410,309 B2* | 8/2016 | Sharratt | ................ | E03C 1/0408 |
| 2005/0127211 A1* | 6/2005 | Yeiser | .................... | B05B 1/205 |
| | | | | 239/587.1 |
| 2012/0286070 A1* | 11/2012 | Lev | ........................ | E03C 1/063 |
| | | | | 239/380 |
| 2014/0326805 A1* | 11/2014 | Zhou | ........................ | B05B 1/18 |
| | | | | 239/397 |

* cited by examiner

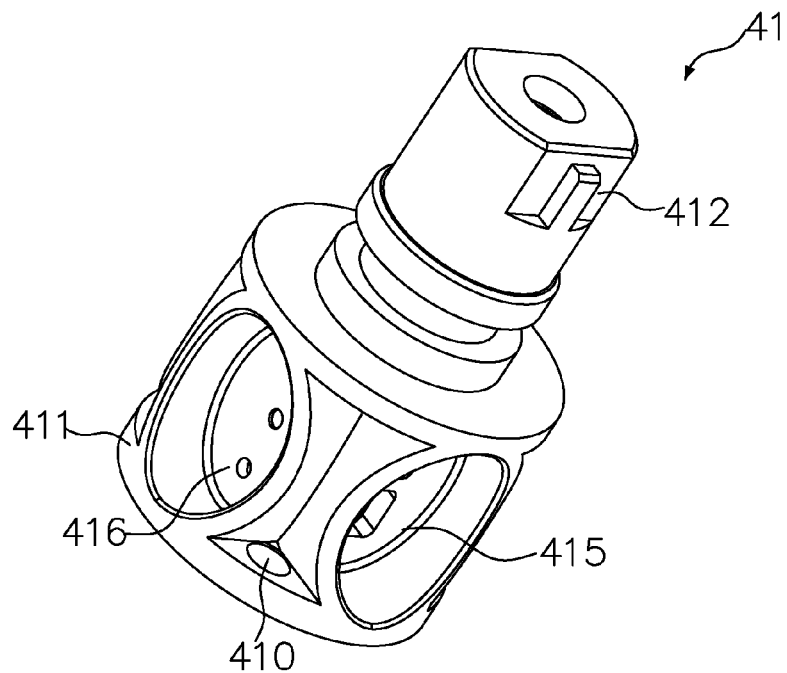
F I G. 7B
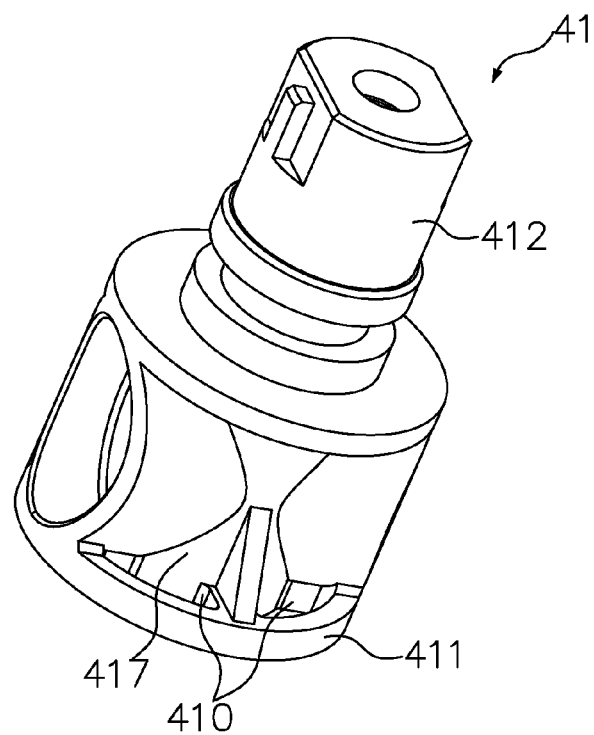
F I G. 7C

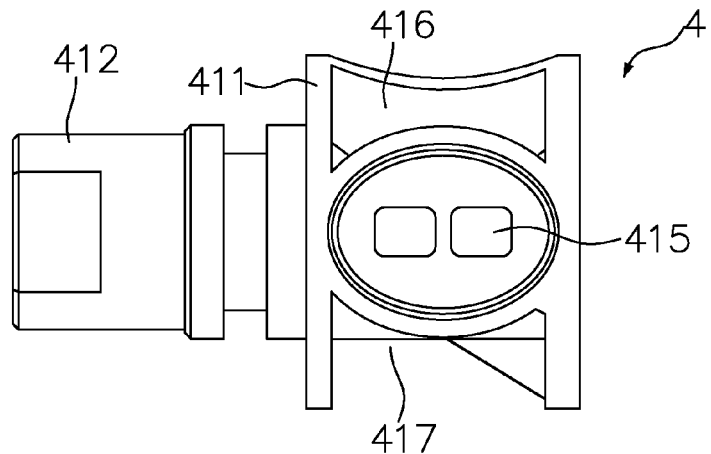
F I G. 7D
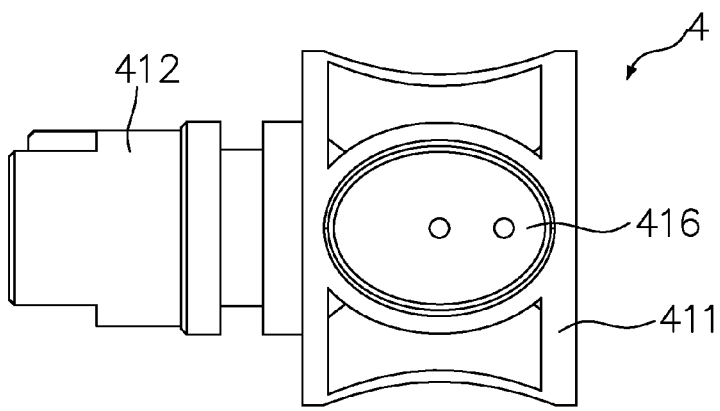
F I G. 7E
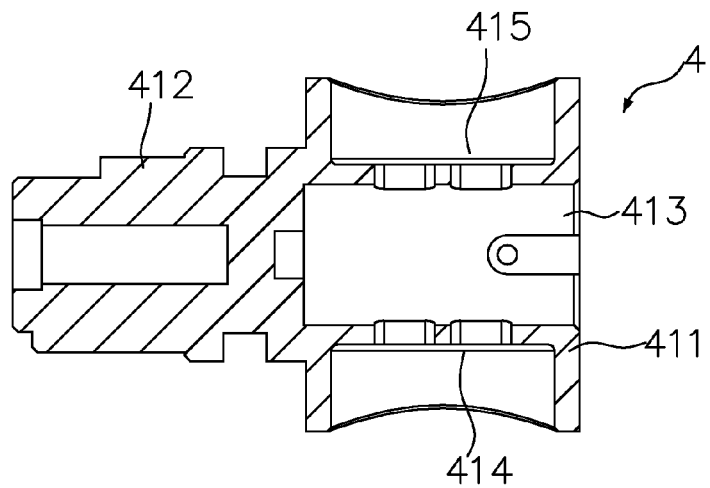
F I G. 7F

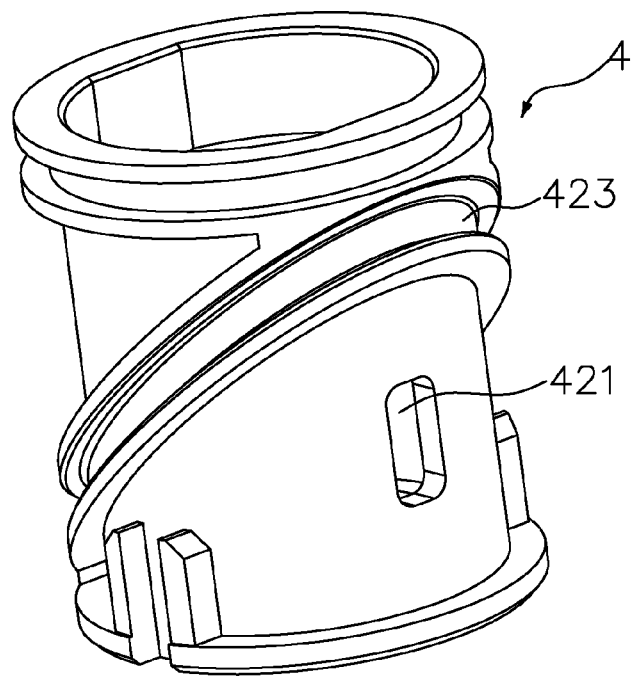
F I G. 8A
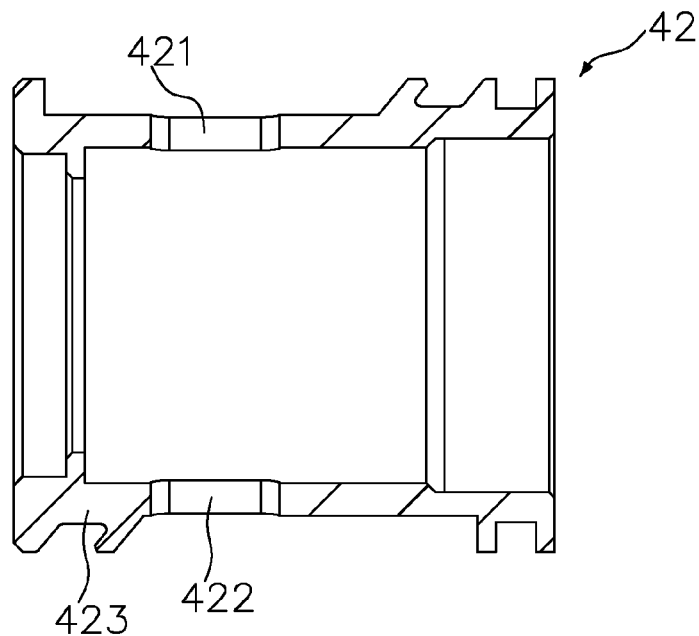
F I G. 8B

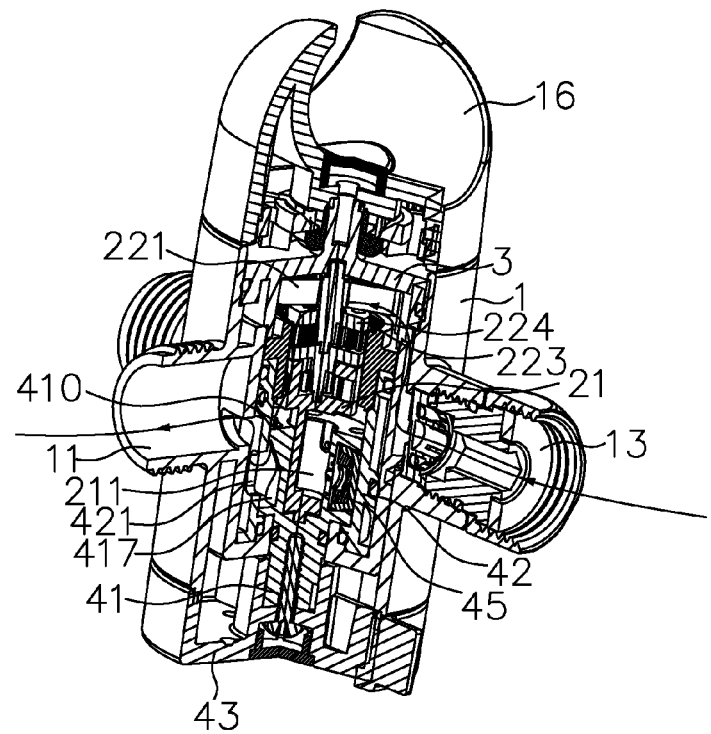
F I G. 9
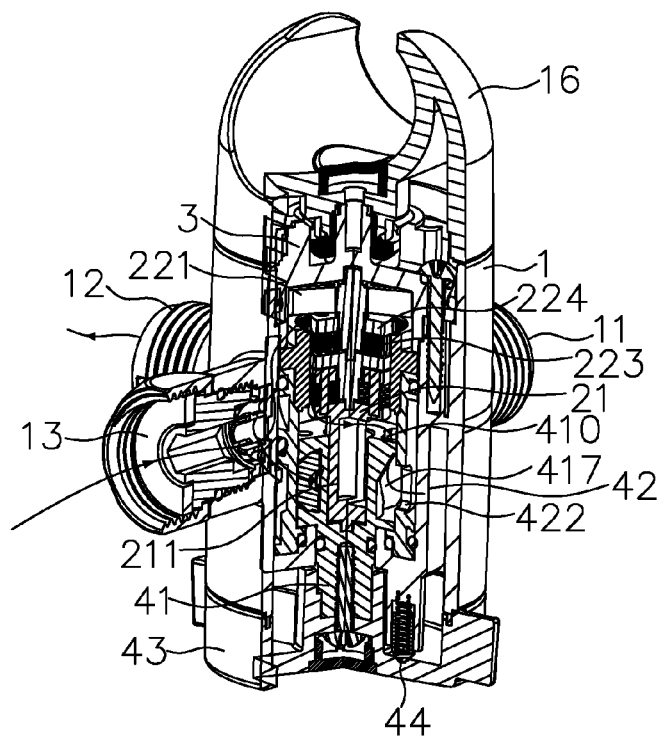
F I G. 10

WATER SAVING CONTROL MECHANISM

BACKGROUND OF THE INVENTION (a) Technical Field of the Invention

The present invention relates to a water outflow control mechanism for taking a shower, and more particularly to a water saving control mechanism.

(b) Description of the Prior Art

With the growing population and the continuous development of economy, freshwater resources are increasingly tight. Water saving becomes an urgent problem to be solved.

In general, a combined shower head is used for taking a shower. The combined shower head comprises a fixed shower head, a hand-held shower head, and a three-way socket. If the user wants the shower heads to discharge water simultaneously and to achieve a water-saving function, the water outflow will be reduced greatly. This doesn't have the effect of a shower. The present invention is to solve the problem how to effectively use the fixed shower head and the hand-held shower head to achieve the effect of a shower and the function of water-saving.

SUMMARY OF THE INVENTION

The primary object of the present invention is to provide a water saving control mechanism which can control different shower heads to supply water by turns so as to relieve fatigue.

A further object of the present invention is to provide a water saving control mechanism which provides water outflow in different ways.

In order to achieve the aforesaid object, the water saving control mechanism of the present invention comprises a main body and a dynamic distribution device disposed in the main body. The main body is a three-way configuration having two water outlets and a water inlet. The dynamic distribution device comprises a stopper disposed in a water channel of the main body and a drive assembly driven by water flow to bring the stopper to move. When the stopper is driven by the drive assembly, the stopper is to block one of the water outlets by turns for water outflow.

Preferably, the water inlet of the main body is directly disposed at an axial end of the main body.

Preferably, the drive assembly comprises an impeller disposed at a front end of a main water passage of the main body. A rear portion of the impeller is connected with the stopper. A decelerator is provided between the impeller and the stopper. The decelerator is composed of a gear set.

Preferably, an upper portion of the stopper is formed with a mating seat for accommodating the gear set, and a lower portion of the stopper is a post having an axial trough at one side thereof.

Preferably, the water saving control mechanism further comprises a static distribution device. The static distribution device comprises a switch member and a switch handle. The switch member is fitted on the stopper. The switch member is connected with the switch handle disposed outside the main body to be turned synchronously to elect one of the water outlets of the main body for water outflow.

Preferably, the static distribution device further comprises a distribution member. The switch member is disposed on the stopper and inserted in the distribution member to cooperate with the distribution member in an airtight manner. The distribution member is disposed at the water outlets of the main body. The distribution member includes distribution outlets to communicate with the water outlets of the main body, respectively. The switch member is connected with the switch handle disposed outside the main body to be turned synchronously to control one of the distribution outlets of the distribution member for water outflow.

Preferably, the front of the switch member is formed with a switch seat. The rear of the switch member is formed with an end head to mate with the switch handle. The middle of the switch member is formed with a receiving cavity to receive the stopper. The side wall of the switch member is formed with a first water cavity and a second water cavity corresponding to the two water outlets of the main body. The outer wall of one side of the switch seat between the first water cavity and the second water cavity is provided with a recess to accommodate a sealing gasket. The outer wall of another side of the switch seat, opposite to the recess, is formed with a reduced cavity. The front end surface of the switch seat is provided with an outlet communicating with the reduced cavity. An elastic sealing member is provided in the first water cavity and the second water cavity of the switch member to mate with the distribution member in an airtight manner.

Accordingly, the present invention uses the main body which is a three-way configuration and the dynamic distribution device disposed in the main body for water outflow by turns through different outlets. When the present invention is used to take a shower, it not only saves water but also provides a massage effect to relieve fatigue.

In addition, the main body is further provided with the static distribution device having the switch member for water outflow in different ways.

BRIEF DESCRIPTION OF THE DRAWINGS

FIG. 7B is another perspective view showing the switch member of the present invention;

FIG. 7C is a further perspective view showing the switch member of the present invention;

FIG. 7D is a side view showing the switch member of the present invention;

FIG. 7E is another side view showing the switch member of the present invention;

FIG. 7F is a sectional view showing the switch member of the present invention;

FIG. 8A is a perspective view showing the distribution member of the present invention;

FIG. 8B is a sectional view showing the distribution member of the present invention;

FIG. 9 is a schematic view of the present invention, showing the flow of the water from the first shower head;

FIG. 10 is a schematic view of the present invention, showing the flow of the water from the second shower head;

DETAILED DESCRIPTION OF THE PREFERRED EMBODIMENTS

Figure 1:
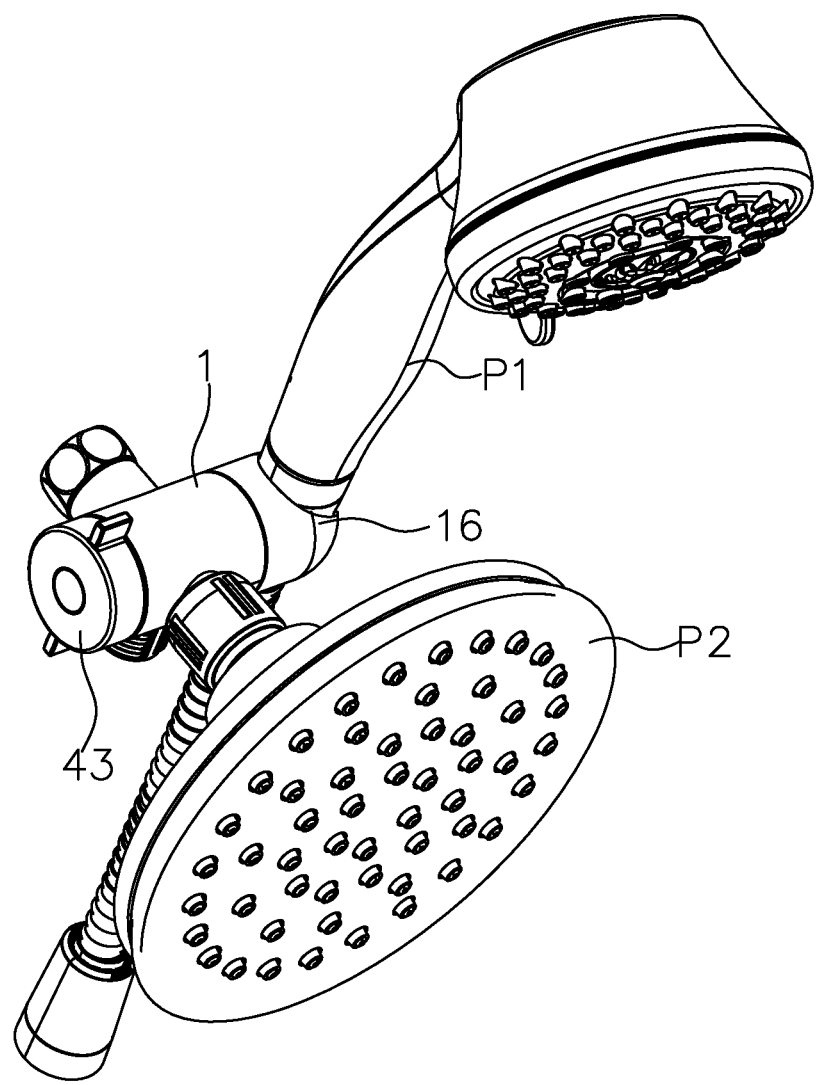
FIG. 1 is a perspective view of the present invention applied to the shower heads.
Figure 2:
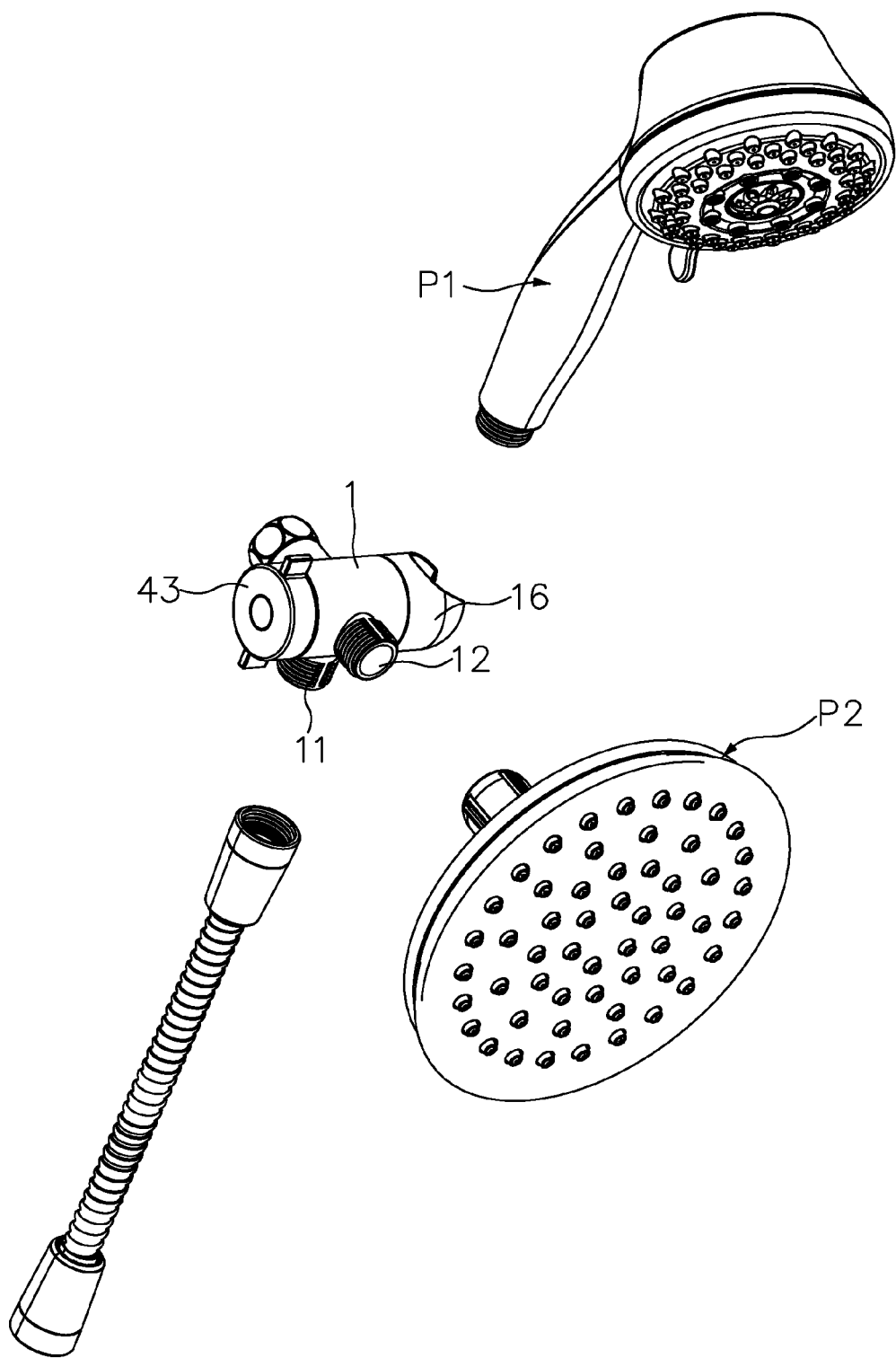
FIG. 2 is an exploded view of the present invention applied to the shower heads.

Embodiments of the present invention will now be described, by way of example only, with reference to the accompanying drawings.

As shown in FIG. 1 to FIG. 12, the present invention discloses a water saving control mechanism. The water saving control mechanism comprises a main body 1 and a dynamic distribution device 2 disposed in the main body 1. The main body 1 comprises a three-way casing which has a water inlet 13, a first water outlet 11 communicating with a first shower head P1, and a second water outlet 12 communicating with a second shower head P2. The dynamic distribution device 2 comprises a stopper 21 disposed in the water channel of the main body 1 and a drive assembly 22 which is driven by the water flow to bring the stopper 21 to move. The stopper 21 is disposed between the first water outlet 11 and the second water outlet 12. When the stopper 21 is driven by the drive assembly 22, the stopper 21 is adapted to block the first water outlet 11 and the second water outlet 12 alternatively, such that the first shower head P1 and the second shower head P2 are to discharge water by turns.

Figure 3A:
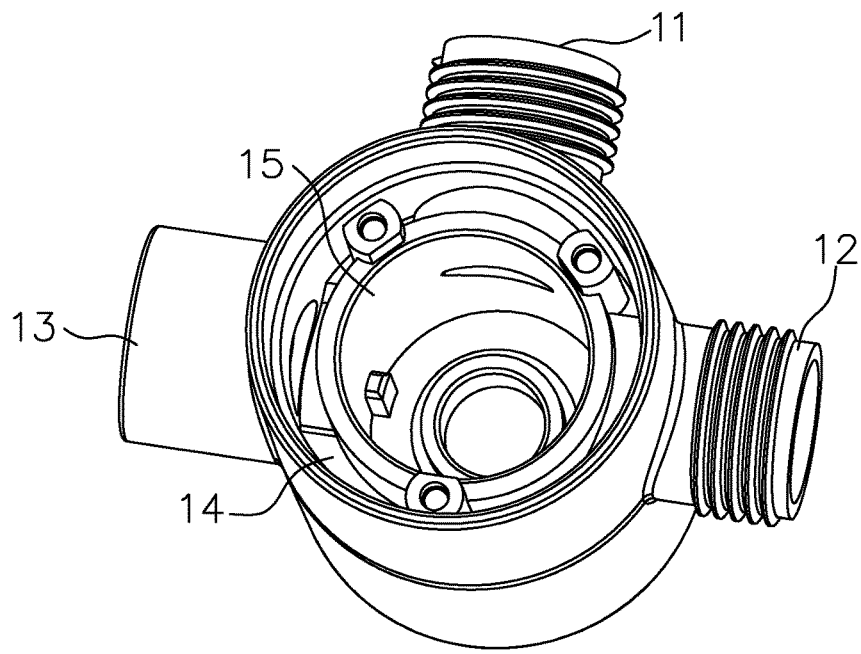
FIG. 3A is a perspective view showing the main body of the present invention.
Figure 3B:
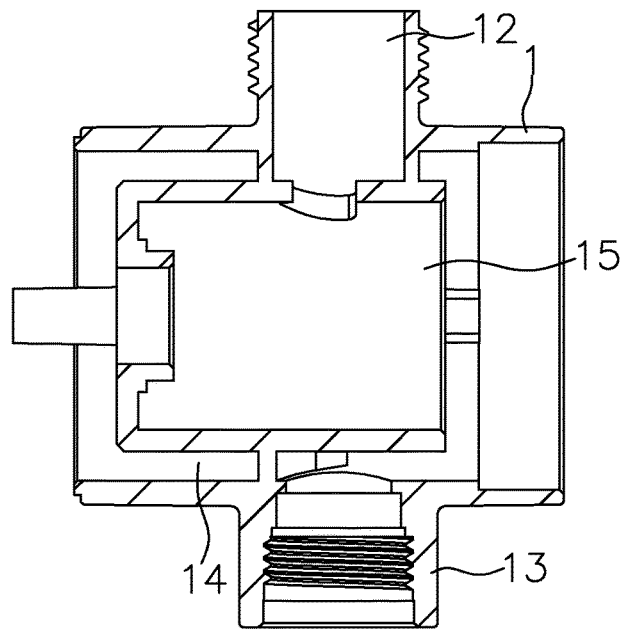
FIG. 3B is a sectional view showing the main body of the present invention.

As shown in FIG. 3A and FIG. 3B, the main body 1 is a cylindrical casing. In this embodiment, the water inlet 13 is disposed at a radial position of the main body 1. The first water outlet 11 and the second water outlet 12 are disposed at the same radial circumference as the water inlet 13. The main body 1 has a guide water channel 14 therein for guiding the water from the water inlet 13 to the axial end of the main body 1 and then to enter a main water passage 15. An outer end of the main body 1 is provided with a socket 16 for retaining the shower head, such as the first shower head P1 which can be a movable shower head.

Figure 11:
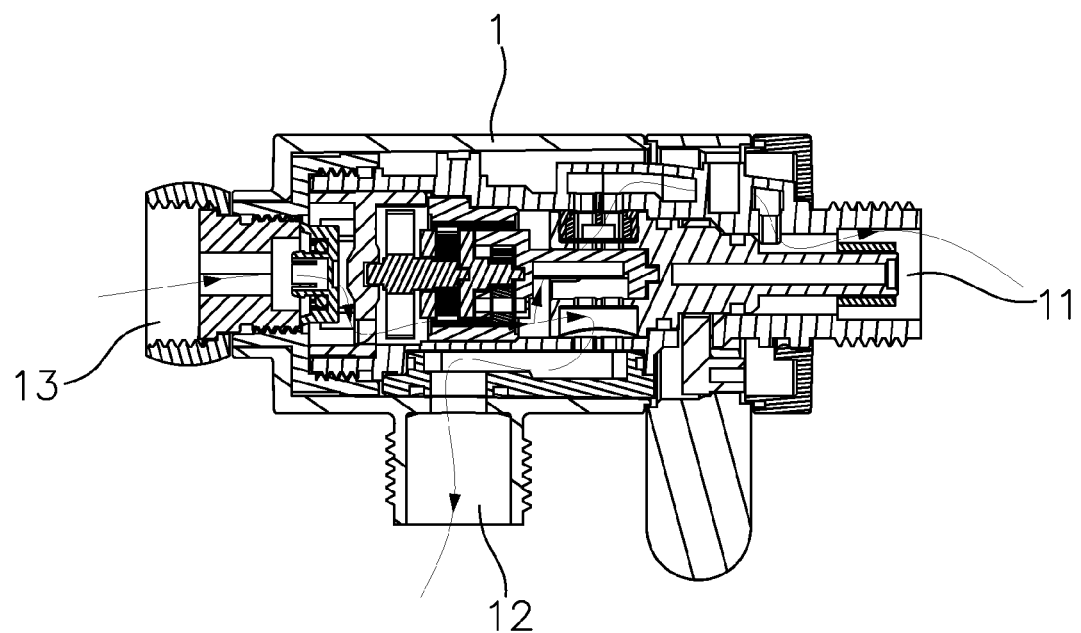
FIG. 11 is a sectional view of another embodiment of the present invention.
Figure 12:
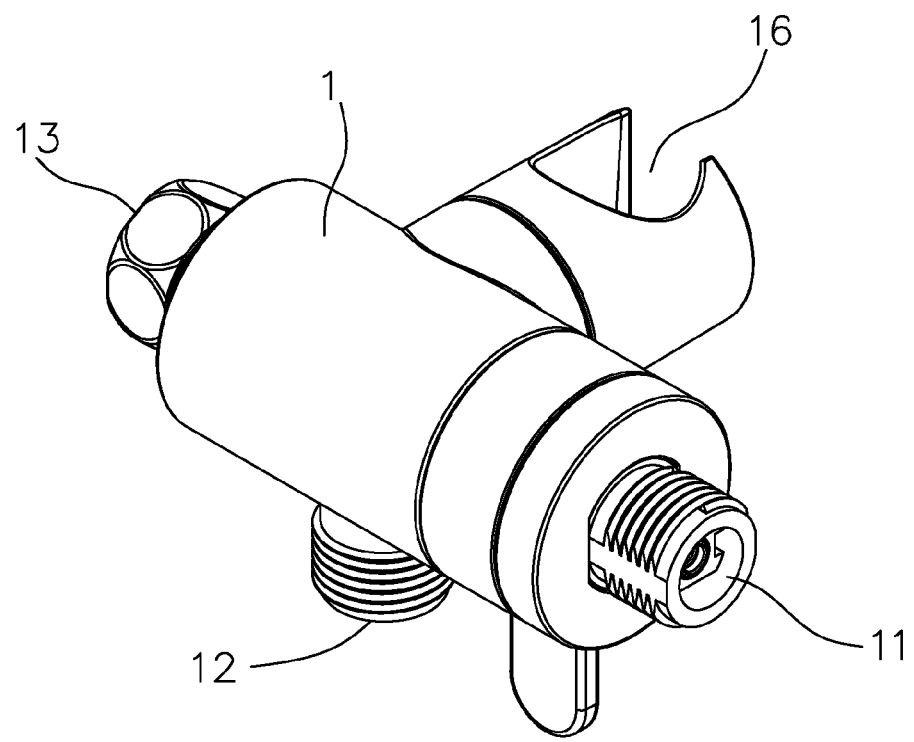
FIG. 12 is a perspective view of another embodiment of the present invention.

The water inlet 13 may be directly disposed at the axial end of the main body 1. In this manner, there is no need for the guide water channel as shown in FIG. 11 and FIG. 12.

Figure 4A:
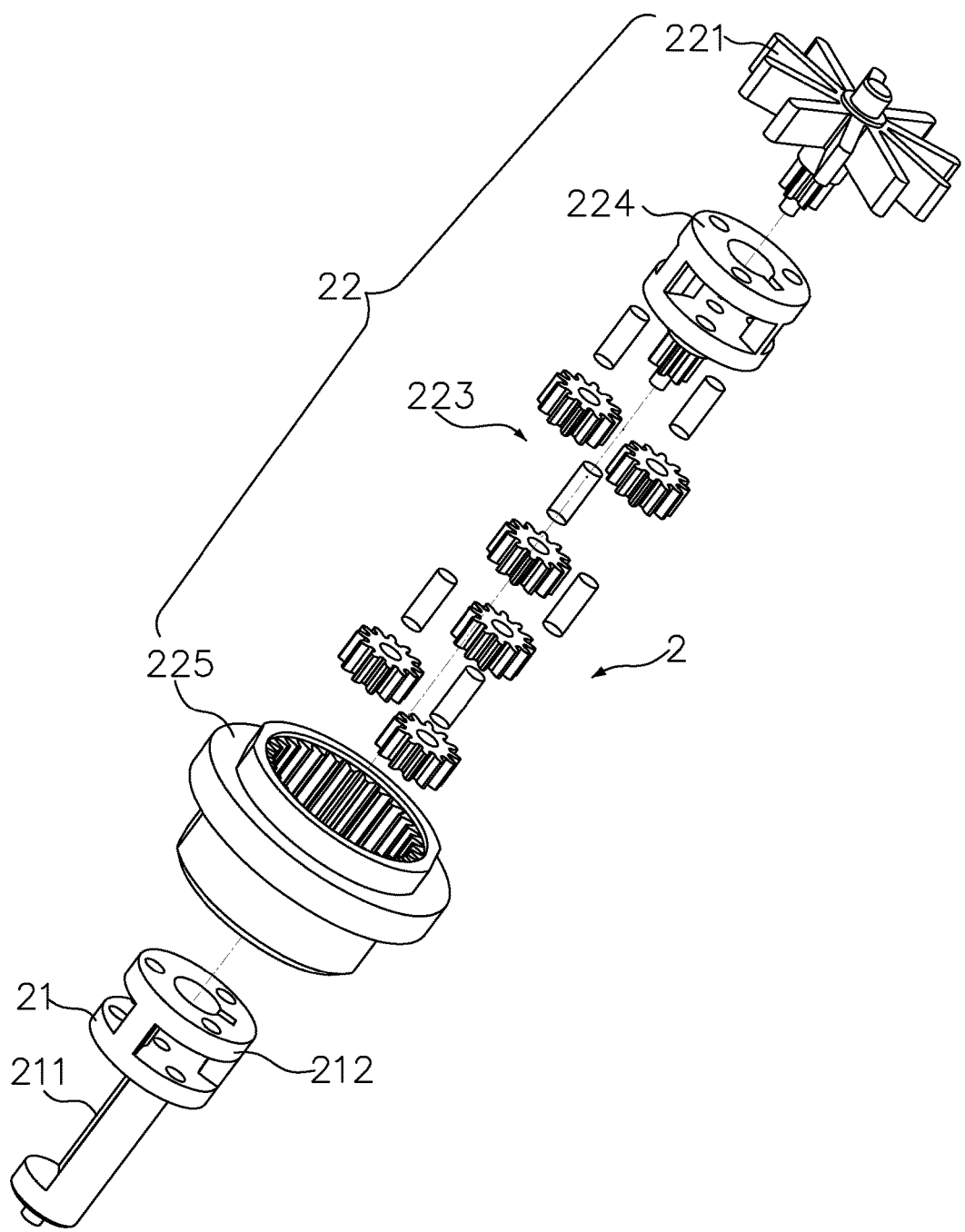
FIG. 4A is an exploded view showing the dynamic distribution device of the present invention.
Figure 4B:
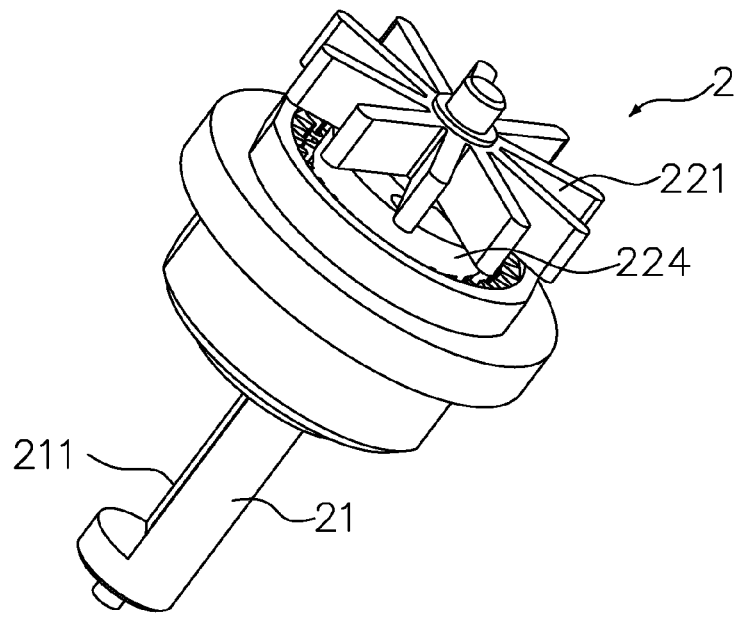
FIG. 4B is a perspective view showing the dynamic distribution device of the present invention.
Figure 4C:
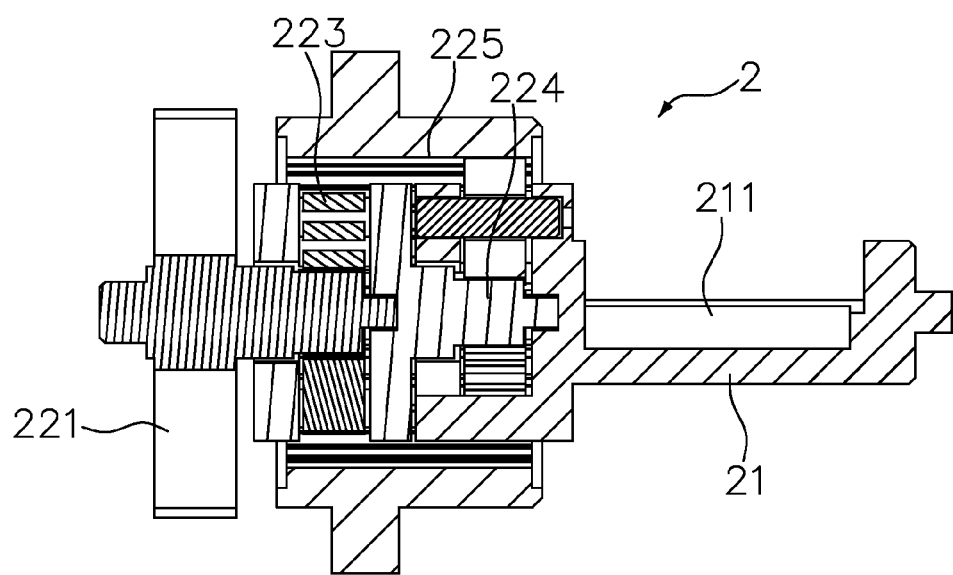
FIG. 4C is a sectional view showing the dynamic distribution device of the present invention.

As shown in FIG. 4A to FIG. 4C, the drive assembly 22 comprises an impeller 221 disposed at a front end of the main water passage 15. A rear portion of the impeller 221 is connected with the stopper 21. The drive assembly 22 further comprises a decelerator 222 disposed between the impeller 221 and the stopper 21. The decelerator 222 can be composed of a gear set 223. It also can be composed of a gear set 223, a transmission member 224, and a toothed ring 225.

An upper portion of the stopper 21 is formed with a mating seat 212 for accommodating the gear set 223, and a lower portion of the stopper 21 is a post having an axial trough 211 at one side thereof.

The transmission member 224 coupled with the gear set 223 and the stopper 21 coupled with the gear set 223 are mounted in the toothed ring 225. The impeller 221 is connected with the transmission member 224 to constitute the dynamic distribution device 2.

The dynamic distribution device 2 is sealed in the main water passage 15 of the main body 1 by a press cover 3. The press cover 3 is formed with an inclined water inlet 31 for forming the water flow to drive the impeller 221.

Figure 5:
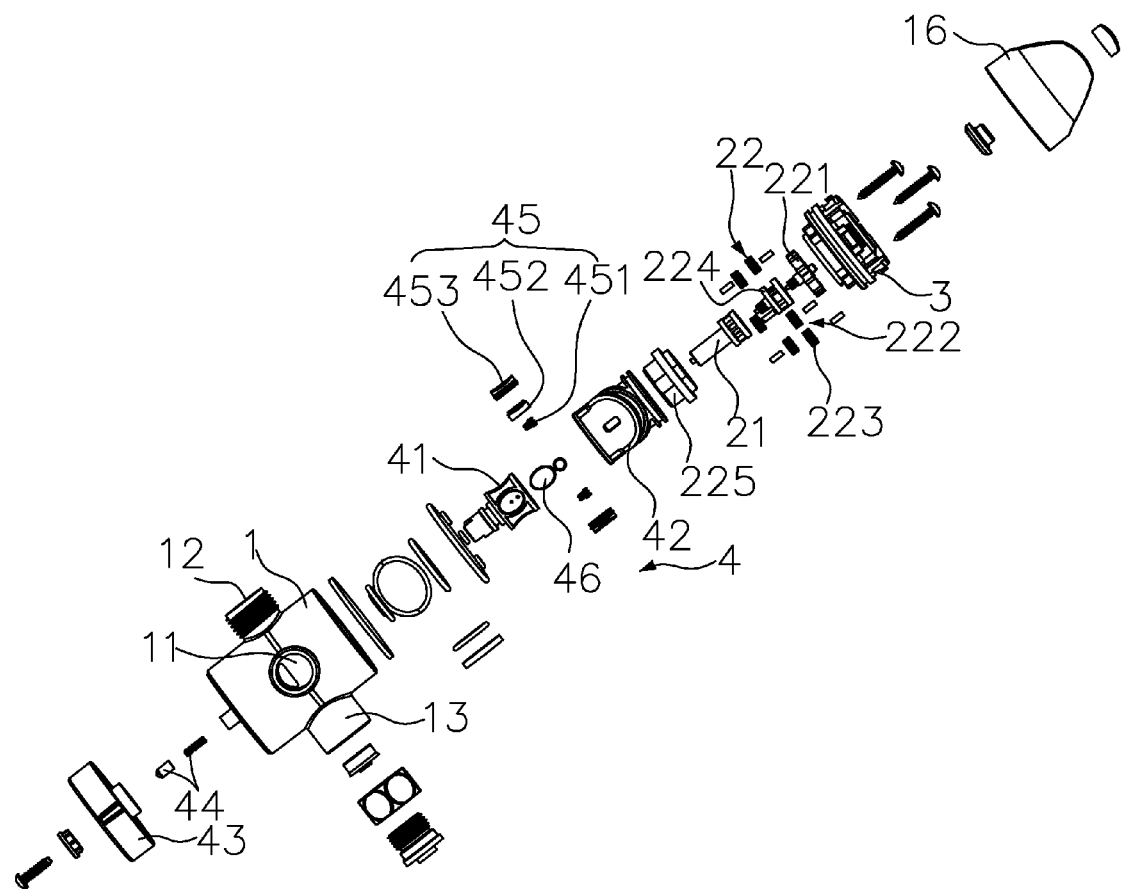
FIG. 5 is an exploded view of the present invention.

As shown in FIG. 5, for a diversity of the water saving control mechanism, the main body 1 is further provided with a static distribution device 4. The static distribution device 4 comprises a switch member 41, a distribution member 42, and a switch handle 43. The switch member 41 is disposed on the stopper 21 and sleeved by the distribution member 42 to cooperate with the distribution member 42 in an airtight manner. The distribution member 42 is disposed at the first water outlet 11 and the second water outlet 12 of the main body 1. The distribution member 42 includes a first distribution outlet 421 and a second distribution outlet 422 to communicate with the first water outlet 11 and the second water outlet 12, respectively. The switch member 41 is connected with the switch handle 43 disposed outside the main body 1 to be turned synchronously for selectively controlling the distribution outlets of the distribution member 42 to discharge water. A stop pin 44 is provided between the switch handle 43 and the main body 1 for the user to know the switch position.

Figure 6A:
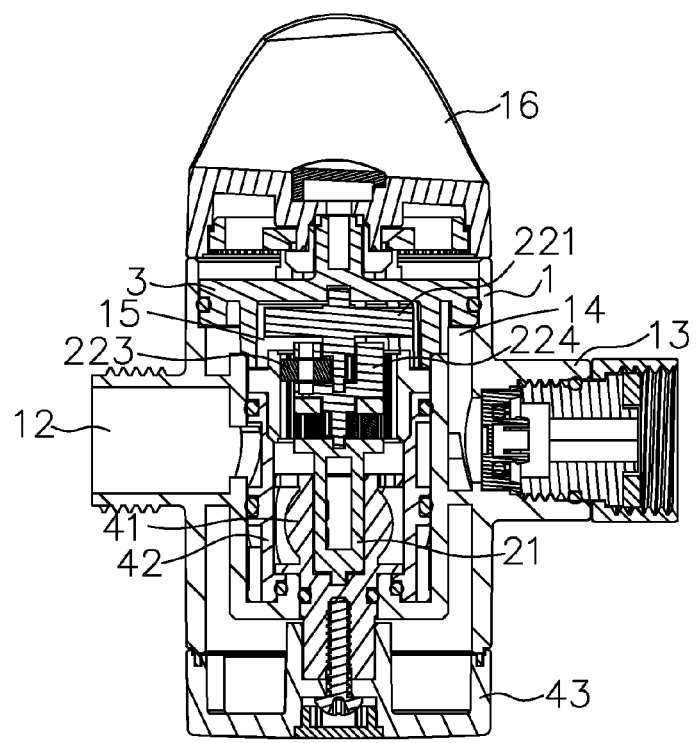
FIG. 6A is an axial sectional view of the present invention.
Figure 6B:
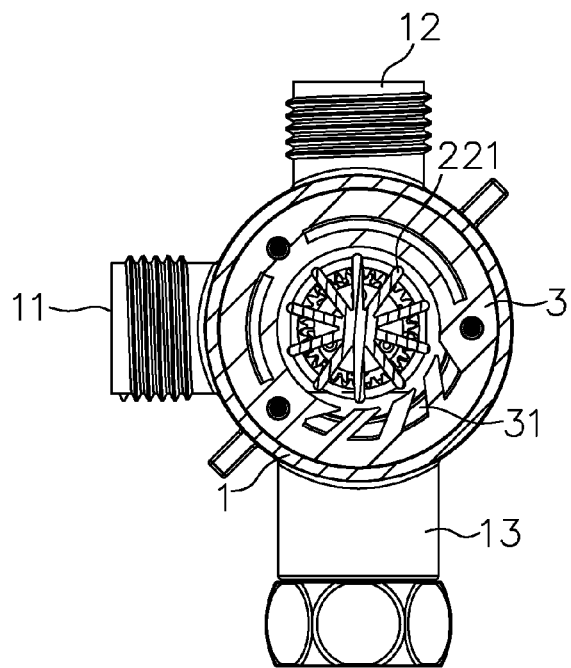
FIG. 6B is a transverse sectional view of the present invention, showing the position of the impeller.
Figure 6C:
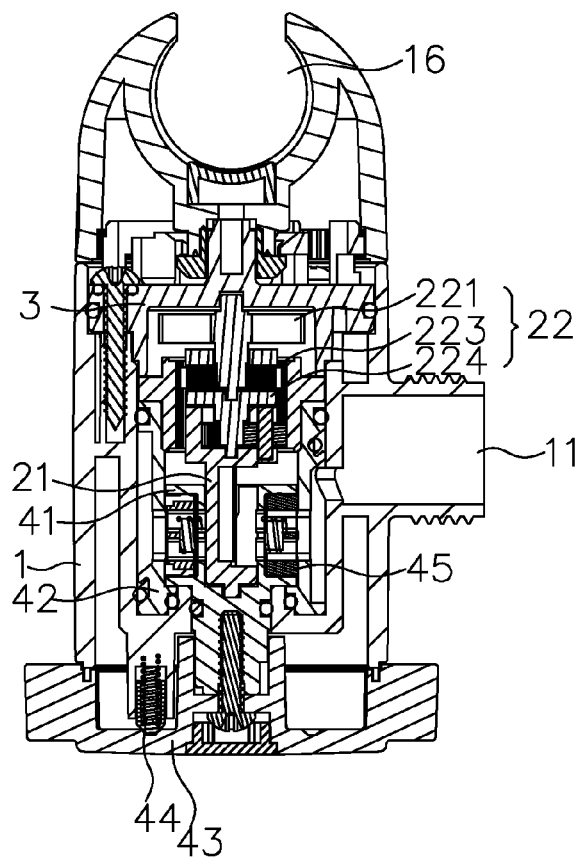
FIG. 6C is another axial sectional view of the present invention.
Figure 7A:
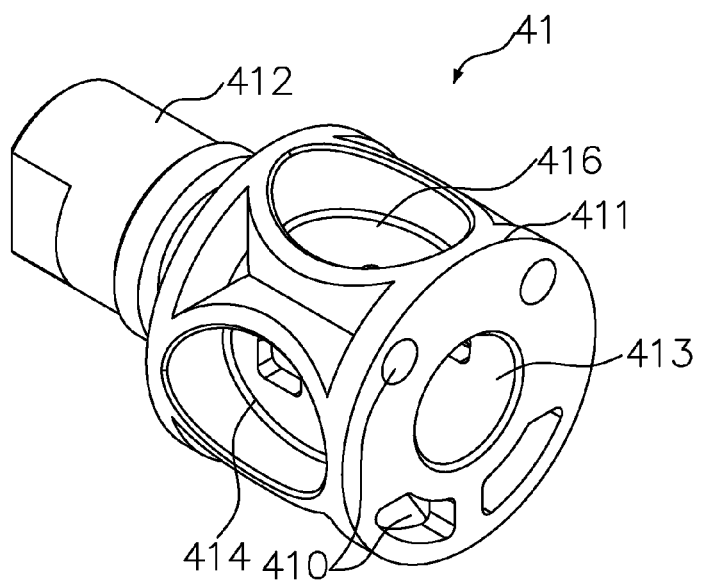
FIG. 7A is a perspective view showing the switch member of the present invention.

As shown in FIG. 6A to FIG. 6C, when in use, the water flow drives the impeller 221 to turn. The impeller 221 is decelerated by the decelerator 222 to bring the stopper 21 to move circumferentially. The switch handle 43 brings the switch member 41 synchronously. When a first water cavity 414 and a second water cavity 415 of the switch member 41 correspond in position to the first distribution outlet 421 and the second distribution outlet 422 of the distribution member 42 and the trough 211 of the stopper 21 is aligned with the first water cavity 414, the first shower head P1 communicating with the first water outlet 12 of the main body 1 is to discharge water, meanwhile, the other side of the stopper 21, opposite to the groove 211, is to block the second water cavity 415, such that the second shower head P2 communicating with the second water outlet 12 of the main body 1 is closed. When the trough 211 of the stopper 21 is aligned with the second water cavity 415, the second shower head P2 communicating with the second water outlet 12 of the main body 1 is to discharge water, meanwhile, the other side of the stopper 21, opposite to the groove 211, is to block the first water cavity 414, such that the first shower head P1 communicating with the first water outlet 11 of the main body 1 is closed. In this way, the first shower head P1 and the second shower head P2 are to discharge water by turns. This way can relieve fatigue and save water.

As shown in FIG. 7A to FIG. 7F, the front of the switch member 41 is formed with a switch seat 411 to mate with the distribution member 42. The rear of the switch member 41 is formed with an end head 412 to mate with the switch handle 43. The middle of the switch member 41 is formed with a receiving cavity 413 to receive the stopper 21. The side wall of the switch member 41 is formed with a first water cavity 414 and a second water cavity 415 corresponding to the first water outlet 11 and the second water outlet 12 of the main body 1. In this embodiment, the first water cavity 414 and the second water cavity 415 are disposed oppositely. The outer wall of one side of the switch seat 411 between the first water cavity 414 and the second water cavity 415 is provided with a recess 416 to accommodate a sealing gasket 46. The outer wall of another side of the switch seat 411, opposite to the recess 416, is formed with a reduced cavity 417. The front end surface of the switch seat 411 is provided with an outlet 410 communicating with the reduced cavity 417. An elastic sealing member 45 is provided in the first water cavity 414 and the second water cavity 415 of the switch member 41 to mate with the distribution member 42 in an airtight manner. The elastic sealing member 45 comprises a spring 451, a frame 452, and a sealing ring 453. This arrangement ensures the airtightness when the switch member 41 is turned relative to the distribution member 42.

As shown in FIG. 8A and FIG. 8B, the distribution member 42 is a cylindrical sleeve. The side wall of the distribution member 42 is provided with a first distribution outlet 421 and a second distribution outlet 422 corresponding to first water outlet 11 and the second water outlet 12 of the main body 1. The outer wall of the distribution member 42 is provided with a protruding wall 423 in cooperation with the sealing member to mate with the inner wall of the main body 1 in an airtight manner to form the first outlet cavity and the second outlet cavity, preventing the first water outlet 11 and the second water outlet 12 from connecting with each other.

Referring to FIG. 9 and FIG. 10, the working principle of the present invention is described hereinafter. The switch handle 43 is rotated to bring the switch member 41 until the first water cavity 414 and the second water cavity 415 of the switch member 41 face the first distribution outlet 421 and the second distribution outlet 422 of the distribution member 42 respectively, or the second distribution outlet 422 and the first distribution outlet 421 of the distribution member 42 respectively. At this time, the water channels of the first shower head P1 and the second shower head P2 are in an open state to discharge water by turns because the stopper 21 is turning.

The switch handle 43 is rotated to bring the switch member 41 to rotate until the reduced cavity 417 of the switch member 41 is aligned with the first distribution outlet 421 of the distribution member 42. At this time, the first water cavity 414 and the second water cavity 415 of the switch member 41 are not in communication with the first distribution outlet 421 and the second distribution outlet 422 of the distribution member 42. The water flows from the outlet 410 at the end surface of the switch member 41 to enter the reduced cavity 417 to flow out through the first distribution outlet 421, such that the water flows out through the first shower head P1 only. Meanwhile, the sealing gasket 46 on the recess 416 of the switch member 41 is aligned with the second distribution outlet 422 of the distribution member 42 to block the second distribution outlet 422, so the water won't flow out through the second shower head P2.

The switch handle 43 is rotated to bring the switch member 41 to rotate until the reduced cavity 417 of the switch member 41 is aligned with the second distribution outlet 422 of the distribution member 42. At this time, the first water cavity 414 and the second water cavity 415 of the switch member 41 are not in communication with the first distribution outlet 421 and the second distribution outlet 422 of the distribution member 42. The water flows from the outlet 410 at the end surface of the switch member 41 to enter the reduced cavity 417 to flow out through the second distribution outlet 422, such that the water flows out through the second shower head P2 only. Meanwhile, the sealing gasket 46 on the recess 416 of the switch member 41 is aligned with the first distribution outlet 421 of the distribution member 42 to block the first distribution outlet 421, so the water won't flow out through the first shower head P1.

When the switch handle 43 is rotated to bring the switch member 41 to rotate until the reduced cavity 417 and the first water cavity 414 or the reduced cavity 417 and the second water cavity 415 are located at the two sides of the first distribution outlet 421, the water flows out from both the first shower head P1 and the second shower head P2. Similarly, when the switch handle 43 is rotated to bring the switch member 41 to rotate until the reduced cavity 417 and the first water cavity 414 or the reduced cavity 417 and the second water cavity 415 are located at the two sides of the second distribution outlet 422, the water flows out from both the first shower head P1 and the second shower head P2.

Accordingly, the present invention uses the main body 1 which is a three-way configuration and the dynamic distribution device 2 disposed in the main body 1 for water outflow by turns through different outlets. When the present invention is used to take a shower, it not only saves water but also provides a massage effect to relieve fatigue. In addition, the main body 1 is further provided with the static distribution device 4 having the switch member 41 to achieve water outflow in different ways.

Although particular embodiments of the present invention have been described in detail for purposes of illustration, various modifications and enhancements may be made without departing from the spirit and scope of the present invention. Accordingly, the present invention is not to be limited except as by the appended claims.

We claim:

1. A water saving control mechanism, comprising a main body, a static distribution device and a dynamic distribution device disposed in the main body, the main body being a three-way configuration having two water outlets and a water inlet, the dynamic distribution device comprising a stopper disposed in a water channel of the main body and a drive assembly driven by water flow to bring the stopper to move, wherein when the stopper is driven by the drive assembly, the stopper is to block one of the water outlets by turns for water outflow, the static distribution device comprising a switch member and a switch handle, the switch member being fitted on the stopper, the switch member being connected with the switch handle disposed outside the main body to be turned synchronously to elect one of the water outlets of the main body for water outflow, wherein a front of the switch member is formed with a switch seat, a rear of the switch member is formed with an end head to mate with the switch handle, a middle of the switch member is formed with a receiving cavity to receive the stopper, a side wall of the switch member is formed with a first water cavity and a second water cavity corresponding to the two water outlets of the main body, an outer wall of one side of the switch seat between the first water cavity and the second water cavity is provided with a recess to accommodate a sealing gasket, the outer wall of another side of the switch seat, opposite to the recess, is formed with a reduced cavity, and the sealing gasket and the switch member are turned synchronously to close or open one of the outer outlets of the main body for water outflow.

2. The water saving control mechanism as claimed in claim 1, wherein the drive assembly comprises an impeller disposed at a front end of a main water passage of the main body, a rear portion of the impeller is connected with the stopper, a decelerator is provided between the impeller and the stopper, and the decelerator is composed of a gear set.

3. The water saving control mechanism as claimed in claim 2, wherein an upper portion of the stopper is formed with a mating seat for accommodating the gear set, and a lower portion of the stopper is a post having an axial trough at one side thereof.

4. The water saving control mechanism as claimed in claim 1, wherein the static distribution device further comprises a distribution member, the switch member is disposed on the stopper and inserted in the distribution member to cooperate with the distribution member in an airtight manner, the distribution member is disposed at the water outlets of the main body, and the distribution member includes distribution outlets to communicate with the water outlets of the main body, respectively.

5. The water saving control mechanism as claimed in claim 1, wherein the water inlet of the main body is directly disposed at an axial end of the main body.

* * * * *